(12) United States Patent
Vahle

(10) Patent No.: US 12,459,579 B2
(45) Date of Patent: Nov. 4, 2025

(54) FRONT TRUNK FOR AN ELECTRIC VEHICLE

(71) Applicant: AUDI AG, Ingolstadt (DE)

(72) Inventor: Sebastian Vahle, Landshut (DE)

(73) Assignee: Audi AG, Ingolstadt (DE)

(*) Notice: Subject to any disclaimer, the term of this patent is extended or adjusted under 35 U.S.C. 154(b) by 380 days.

(21) Appl. No.: 18/153,833

(22) Filed: Jan. 12, 2023

(65) Prior Publication Data

US 2023/0219629 A1   Jul. 13, 2023

(30) Foreign Application Priority Data

Jan. 13, 2022 (DE) .......................... 102022100683.2

(51) Int. Cl.
*B62D 25/08* (2006.01)
*B60L 53/18* (2019.01)
*B60S 1/62* (2006.01)

(52) U.S. Cl.
CPC ............ *B62D 25/087* (2013.01); *B60L 53/18* (2019.02); *B60S 1/62* (2013.01)

(58) Field of Classification Search
CPC .......... B62D 25/087; B60S 1/62; B60R 5/02; B60R 5/04; B60R 2011/0036; B60L 53/18
See application file for complete search history.

(56) References Cited

U.S. PATENT DOCUMENTS

| | | | | |
|---|---|---|---|---|
| 5,855,262 A * | 1/1999 | Jackson | ............... | B65H 75/425 242/378.1 |
| 5,860,687 A * | 1/1999 | Corporon | ............... | B62D 43/10 296/37.2 |
| 6,035,983 A * | 3/2000 | Benner | ............... | B65H 75/38 191/12.4 |
| 9,340,143 B2 * | 5/2016 | Stakoe | ............... | B60P 7/0876 |
| 9,783,117 B2 * | 10/2017 | Nieto | ............... | B60R 7/08 |
| 10,112,555 B2 * | 10/2018 | Aguilera Ramirez | .... | B60R 5/04 |
| 10,137,793 B2 * | 11/2018 | Lee | ............... | B60L 53/18 |
| 10,800,313 B2 * | 10/2020 | Frederick | ............... | B60Q 9/00 |
| 11,325,656 B2 * | 5/2022 | Glickman | ............... | B60R 7/02 |
| 11,878,601 B2 * | 1/2024 | Koehler | ............... | B60L 53/18 |
| 2005/0161548 A1 * | 7/2005 | Naneff | ............... | H02G 11/02 242/385 |
| 2021/0114525 A1 * | 4/2021 | Mazzarella | ............ | B32B 3/266 |
| 2023/0406414 A1 * | 12/2023 | Friedrich | ............. | B62D 25/087 |
| 2025/0033567 A1 * | 1/2025 | Mazzarella | ............... | B60R 5/02 |
| 2025/0033571 A1 * | 1/2025 | Zanoli | ............... | B60L 53/14 |

(Continued)

FOREIGN PATENT DOCUMENTS

| | | | |
|---|---|---|---|
| CN | 205039587 U | * | 2/2016 |
| CN | 205253602 U | | 5/2016 |
| CN | 205686334 U | | 11/2016 |

(Continued)

OTHER PUBLICATIONS

Machine Translation of JP2013236500, Mar. 3, 2025.*
Machine Translation of CN205039587, Mar. 3, 2025.*
Machine Translation of DE102022002517, Mar. 3, 2025.*

*Primary Examiner* — Jason S Morrow

(74) *Attorney, Agent, or Firm* — Seed Intellectual Property Law Group LLP

(57) ABSTRACT

The disclosure relates to a trunk under the front hood (or "frunk") of an electric vehicle and a method for cleaning and stowing a charging cable in the frunk.

9 Claims, 1 Drawing Sheet

(56) References Cited

U.S. PATENT DOCUMENTS

2025/0058994 A1* 2/2025 Simonazzi .............. B60L 53/14

FOREIGN PATENT DOCUMENTS

| | | |
|---|---|---|
| CN | 210554292 U | 5/2020 |
| CN | 213594208 U | 7/2021 |
| DE | 102011121303 A1 | 6/2013 |
| DE | 102014215668 A1 | 2/2016 |
| DE | 102015206731 A1 | 10/2016 |
| DE | 102016011587 A1 | 4/2017 |
| DE | 102016224160 A1 | 6/2018 |
| DE | 112017007897 T5 | 5/2020 |
| DE | 202020105380 U1 | 12/2020 |
| DE | 102020114935 B3 | 5/2021 |
| DE | 102020208899 B3 | 5/2021 |
| DE | 102022002517 A1 * | 1/2024 |
| JP | 2013236500 A * | 11/2013 |
| WO | 2012041277 A2 | 4/2012 |

* cited by examiner

FRONT TRUNK FOR AN ELECTRIC VEHICLE

BACKGROUND

Technical Field

Embodiments of the invention relate to a trunk under the front hood (or "frunk") of an electric vehicle and a method for cleaning and stowing a charging cable in the frunk.

Description of the Related Art

The energy accumulators of electric vehicles are generally charged by means of charging cables, which are connected to an external charging device, such as a charging point. In many electric vehicles one end of the charging cable is firmly connected to the energy accumulator, in others a charging cable is used having at both ends a plug for connection to a respective socket of the vehicle and the charging device. When no charging process is being performed, the charging cable is stowed away in the vehicle. A charging cable with plugs at both ends then lies loose and unsecured in the vehicle and may slide around. If the charging cable is used during bad weather, the charging cable becomes fouled. When the charging cable is put back into the vehicle after the end of the charging process, dirt and water can also get into the interior of the vehicle with the charging cable and become distributed therein by the charging cable sliding around.

Cleaning devices for a charging cable are already known, which can be used outside the vehicle. Thus, for example, CN 2 05 253 602 U discloses a cleaning device for a charging cable of a vehicle and a vehicle having the cleaning device. The cleaning device is adapted to be fastened to the charging cable and it comprises: a housing and an inner cleaning core. The inner cleaning core is arranged inside the housing and stands in contact with the charging cable. The cleaning core comprises a brush or a sponge for cleaning the charging cable.

Electric vehicles are also known in which a charging cable connected to the energy accumulator of the vehicle is rolled up on a roll located in the vehicle and in which one end of the charging cable is pulled out for charging the energy accumulator and connected to the charging station.

From DE 10 2014 215 668 A1 there is known a vehicle having a bodywork comprising a bodywork opening which can be closed by a bodywork flap. A charging cable, connected in electrically conductive manner to the storage device of the vehicle, is received in the resting state on a cable uptake device provided in the interior of the bodywork and can be pulled out from the bodywork opening for its use. The charging cable is fashioned as a flexible flat ribbon cable at least in the region which can be taken up by the cable uptake device and it can be led through between one edge of the bodywork opening and the bodywork flap. Inside the bodywork there is provided a cable cleaning apparatus for the flat ribbon cable, in which a first doctoring lip is arranged on the top side of the flat ribbon cable and a second doctoring lip on the bottom side of the flat ribbon cable. In the retracting direction there is provided a respective brush behind the doctoring lips on the top side of the flat ribbon cable and on the bottom side of the flat ribbon cable, which clean away any still clinging and smaller contaminants from the flat ribbon cable. The flat ribbon cable is led vertically through the cable cleaning apparatus so that dirt particles can fall by gravity onto a dirt collection tablet of the cable cleaning apparatus.

DE 10 2011 121 303 A1 relates to a motor vehicle having an energy accumulator, which can be charged by a charging cable firmly installed in the vehicle and having a connection plug which can be pulled out from its stowage site in the vehicle for connection to an external power source. The charging cable is led out from a cable storage, in which it is led from the fixed installation point along an essentially straight segment to a deflection point, then deflected at least once by an angle between 90°-180° and led along another essentially straight segment to the connection plug, and it can be pulled out from its stowage position against a restoring force.

BRIEF SUMMARY

Some embodiments provide a device and a method for making a charging cable having plugs at both ends free of dirt and water and stowed away securely.

Some embodiments include a trunk arranged beneath the front hood of an electric vehicle ("frunk"), comprising a cleaning device for a charging cable having a charging plug at both ends, fastening means for a charging cable having a charging plug at both ends, and a drain for dirty water. In one embodiment, the fastening means comprise two adjacent plastic webs, between which the charging cable can be clamped and thus secured.

In one embodiment, the frunk comprises a plastic tub and the cleaning device and the fastening means are arranged on an inner wall of the plastic tub, and the drain is situated in a floor of the plastic tub. In another embodiment, the cleaning device and the fastening means are arranged at the same height on the inner wall of the plastic tub. In another embodiment, a downward pointing hook is arranged beneath the cleaning device and the fastening means on the inner wall of the plastic tub.

In one embodiment, a cleaning device for a charging cable having plugs at both ends and not permanently connected to the energy accumulator of the electric vehicle ("loose charging cable") is integrated in an upper region of the frunk. In the lower region of the frunk there is provided a drain in which the water removed during the cleaning of the loose charging cable can flow away and be taken away from the vehicle.

In one embodiment, the inner wall of the plastic tub, on which the cleaning device, the fastening means and optionally the downward pointing hook are arranged, is the closest inner wall of the plastic tub (the inside of the rear wall of the plastic tub) to the passenger compartment of the electric vehicle. In another embodiment, the inner wall is the inner wall of the plastic tub (the inside of the front wall of the plastic tub) furthest away from the passenger compartment of the electric vehicle. In another embodiment, the inner wall is the inside of a side wall of the plastic tub. In one embodiment, the cleaning device comprises two adjacent plastic webs, with cleaning elements arranged on their mutually facing inner sides. In another embodiment, the cleaning elements are brushes, sponges, or rubber lips.

In one embodiment, the cleaning device is removably connected to the wall of the plastic tub. In one embodiment, the cleaning device is hung in a recess at the upper edge of a wall of the plastic tub. In another embodiment, the cleaning device is locked in an opening in a wall of the plastic tub. Thus, the cleaning device can be removed from the frunk and used for a cleaning process outside the vehicle.

These embodiments furthermore make it easier to replace the cleaning elements, since when necessary the entire cleaning device can be easily replaced.

Some embodiments include a method for cleaning and stowing a charging cable having a charging plug at either end in a frunk as described herein. The charging cable is completely removed for the charging process and after the end of the charging process it is cleaned by means of the cleaning device integrated in the frunk and then fastened to the integrated fastening feature in the frunk.

In the method, a vertically secured first end of a charging cable having a charging plug at either end is led beneath the charging plug between the plastic webs of the cleaning device and pulled through to the charging plug at the second end of the charging cable, after which the charging cable is rolled up between the cleaning device and the fastening means and the first end of the charging cable is secured by the fastening means.

For the cleaning, a vertically secured end of a charging cable is led beneath the first charging plug between the plastic webs of the cleaning device and pulled through to the second charging plug. In this way, water and grime can be stripped off from the charging cable and can flow away through the drain situated beneath the cleaning device.

After the cleaning, one end of the charging cable remains between the plastic webs of the cleaning device and is thus secured. The charging cable is then rolled up between the cleaning device and the fastening means (charging cable uptake). The other end of the charging cable is then secured by the fastening means. If an embodiment of the frunk is used having a downward pointing hook arranged beneath the cleaning device and the fastening means on the inner wall of the plastic tub, the charging cable can be led through the hook while being rolled up and thus be additionally secured.

Among the benefits of the frunk described herein are that a loose charging cable can be cleaned with the integrated cleaning device and be secured in a charging cable uptake and reliably stowed away with no sliding around. Further benefits and embodiments will emerge from the description and the accompanying drawings.

Of course, the features mentioned above and those yet to be explained can be used not only in the particular indicated combination, but also in other combinations or standing alone.

BRIEF DESCRIPTION OF THE SEVERAL VIEWS OF THE DRAWINGS

Embodiments of the invention are shown schematically with the aid of embodiments in the drawings and shall be further described with reference to the drawings.

DETAILED DESCRIPTION

Figure 1:
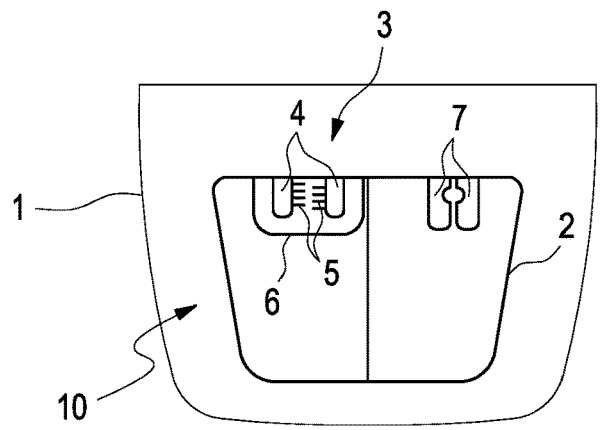
FIG. 1 shows schematically, a view looking at one embodiment of a frunk.

FIG. 1 shows schematically a view looking at one embodiment of a frunk 2. The outer wall of the frunk 2 is formed by a plastic tub arranged beneath a front hood 1 of an electric vehicle. On a rear (facing away from the front of the vehicle) inner wall of the plastic tub there is arranged in the frunk 2 a cleaning device 3 for a charging cable 9. The cleaning device 3 comprises two plastic webs 4, on the mutually facing inner sides of which there are arranged cleaning elements 5, which can usually be brushes, sponges, or rubber lips. Beneath the cleaning device 3 is located a drain 6, by which dirty water can be carried away from the frunk 2. In one embodiment, the drain 6 has a screen. Furthermore, a bracket 7 for a charging cable 9 is arranged on the rear inner wall of the plastic tub at the same height as the cleaning device 3.

Figure 2:
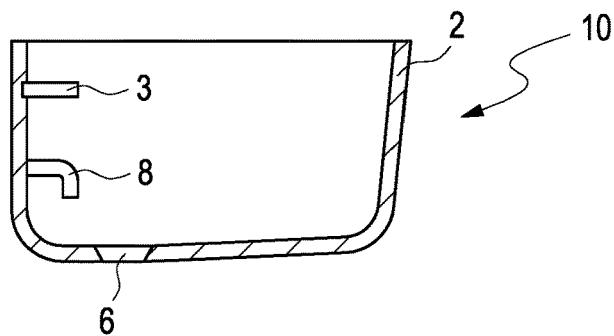
FIG. 2 shows schematically, a longitudinal section through one embodiment of a frunk.

FIG. 2 shows schematically a longitudinal section of one embodiment of a frunk 2 with a cleaning device 3 arranged on the rear inner wall of the plastic tub and a drain 6 in the floor of the plastic tub. In the embodiment shown, an additional downward pointing hook 8 is arranged on the rear inner wall of the plastic tub in a position beneath the cleaning device 3 and the bracket 7, around which a charging cable 9 can be led in order to secure it additionally.

Figure 3:
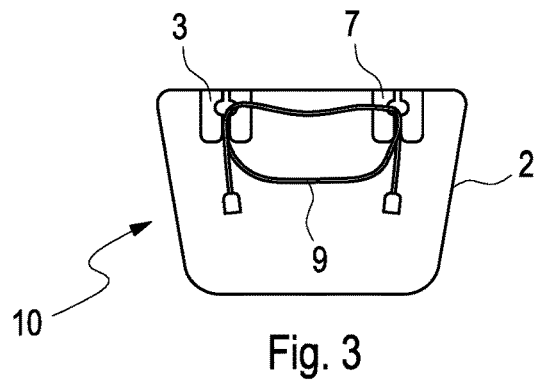
FIG. 3 shows schematically, a view looking at one embodiment of a frunk with a secured charging cable.

FIG. 3 shows schematically a view looking at one embodiment of a frunk 2 with a secured charging cable 9. The charging cable 9 is led through the cleaning device 3 and the bracket 7, where it is held and secured.

Figure 4:
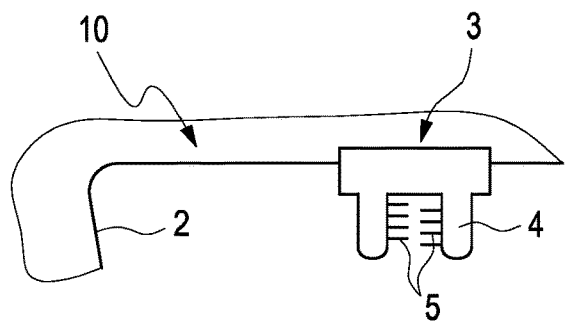
FIG. 4 shows schematically, a cutout from a view looking at another embodiment of a frunk.

FIG. 4 shows schematically a cutout from a view looking at another embodiment of a frunk 2. In the embodiment shown, the two plastic webs 4 with the cleaning device 3 having cleaning elements 5 are detachably connected to the frunk 2, for example, they are hung in a recess at the upper edge of the rear wall of the plastic tub or locked in an opening in the rear wall of the plastic tub. The cleaning device 3 can thus be removed from the frunk 2 and used for a cleaning process outside the vehicle. This embodiment furthermore facilitates a replacement of the cleaning elements 5, since the entire cleaning device 3 can be easily replaced when needed.

German patent application no. 10 2022 100683.2, filed Jan. 13, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A trunk arranged beneath the front hood of an electric vehicle, comprising:
    a cleaning device including one or more cleaning elements configured to assist in cleaning a charging cable having a charging plug at both ends,
    a charging cable bracket configured to receive the charging cable having the charging plug at both ends,
    a drain for dirty water,
    a tub, and
    a downward pointing hook arranged beneath the cleaning device and the charging cable bracket on an inner wall of the tub.

2. The trunk according to claim 1, wherein the cleaning device and the charging cable bracket are arranged on the inner wall of the tub, and the drain is situated in a floor of the tub.

3. The trunk according to claim 1, wherein the cleaning device and the charging cable bracket are arranged at the same height on the inner wall of the tub.

4. The trunk according to claim 1, wherein the inner wall is the closest inner wall of the tub to the passenger compartment of the electric vehicle.

5. The trunk according to claim 1, wherein the inner wall is the inner wall of the tub furthest away from the passenger compartment of the electric vehicle.

6. The trunk according to claim 1, wherein the cleaning device comprises two adjacent webs, with the one or more cleaning elements arranged on mutually facing inner sides of each of the two adjacent webs.

7. The trunk according to claim 6, wherein the one or more cleaning elements are brushes, sponges, or rubber lips.

8. The trunk according to claim 1, wherein the cleaning device is removably connected to the wall of the tub.

9. A method for cleaning and stowing a charging cable having a charging plug at either end in a trunk arranged under the front hood of an electric vehicle, the trunk including a cleaning device including one or more cleaning elements configured to assist in cleaning the charging cable and including two adjacent webs, a charging cable bracket configured to receive the charging cable, a drain for dirty water, a tub, and a downward pointing hook arranged beneath the cleaning device and the charging cable bracket on an inner wall of the tub, the method comprising:

leading a vertically secured first end of the charging cable between the webs of the cleaning device, and pulling the charging cable through the webs of the cleaning device, after which the charging cable is rolled up between the cleaning device and the charging cable bracket and through the downward pointing hook, and the first end of the charging cable is secured by the charging cable bracket.

\* \* \* \* \*